United States Patent [19]
Wylie et al.

[11] Patent Number: 5,065,585
[45] Date of Patent: Nov. 19, 1991

[54] SYSTEM FOR COOLING THE INTERIOR OF A BUILDING

[75] Inventors: Calvin R. Wylie, Fair Oaks; Patrick H. Crites, Orangevale, both of Calif.

[73] Assignee: Beutler Heating and Air Conditioning, Inc., Sacramento, Calif.

[21] Appl. No.: 605,076

[22] Filed: Oct. 25, 1990

[51] Int. Cl.⁵ .............................................. F25B 25/00
[52] U.S. Cl. ......................................... 62/89; 62/180; 62/332
[58] Field of Search ................. 236/49.3; 62/332, 180, 62/186, 89, 409; 165/16

[56] References Cited

U.S. PATENT DOCUMENTS

| | | | |
|---|---|---|---|
| 2,407,036 | 9/1946 | Snavely | 236/46 R |
| 4,397,157 | 8/1983 | Keuch | 62/180 |
| 4,478,056 | 10/1984 | Michaels, Jr. | 62/332 |
| 4,882,913 | 11/1989 | LaCount et al. | 165/16 X |
| 4,915,194 | 4/1990 | Wylie | 236/49.3 |
| 5,000,381 | 3/1991 | Mueller et al. | 165/16 X |

*Primary Examiner*—William E. Wayner
*Attorney, Agent, or Firm*—Thomas R. Lampe

[57] ABSTRACT

A system for cooling the interior of a building which monitors the temperature differential between indoor and outdoor air, and provides outside ventilation and cooling when there is a demand for cooling and the indoor air temperature exceeds the outdoor air temperature by a predetermined degree. The system includes an air conditioner for supplementing the cooling effect provided by the outdoor air in a controlled manner.

4 Claims, 5 Drawing Sheets

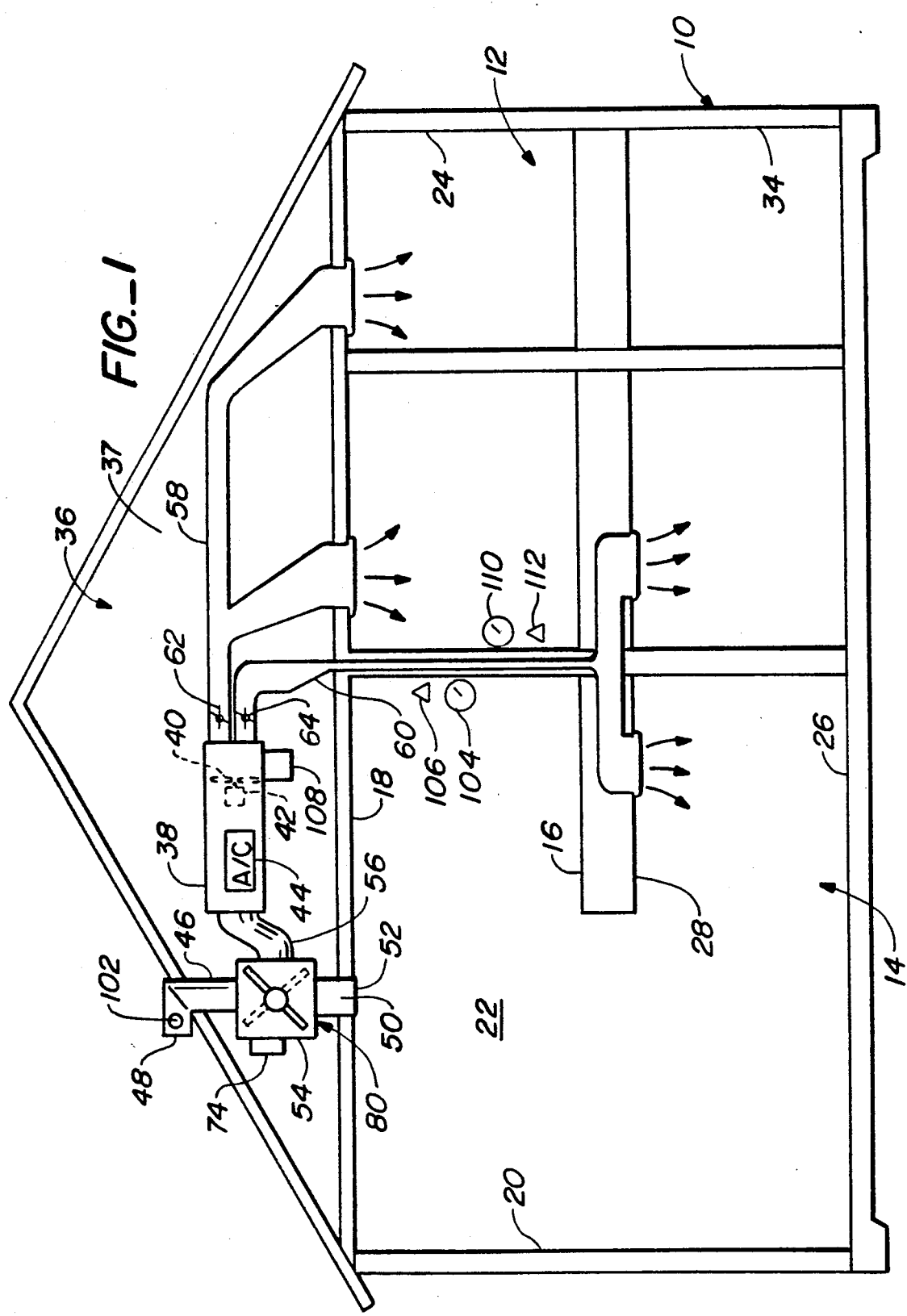
FIG._1

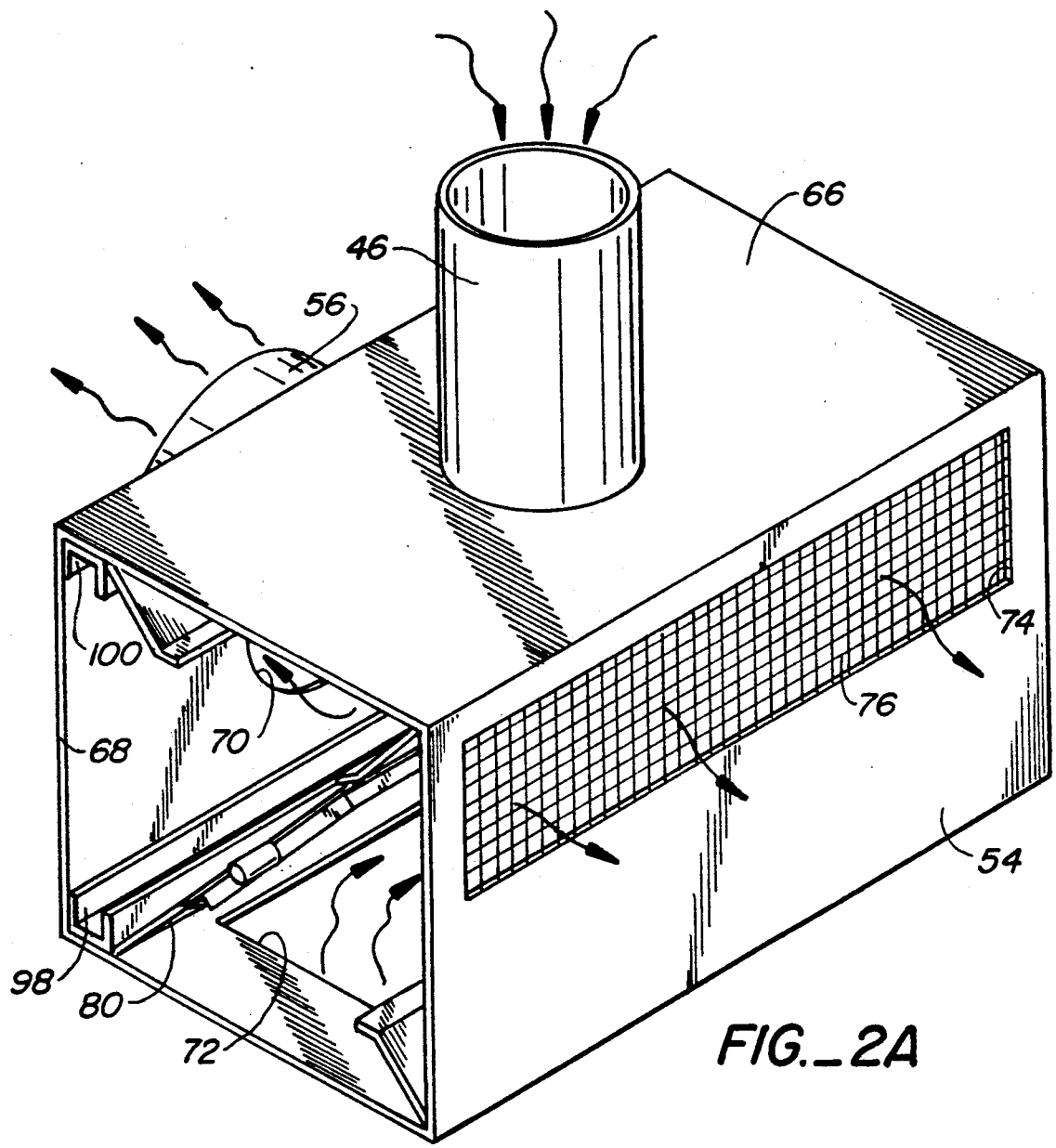
FIG._2A

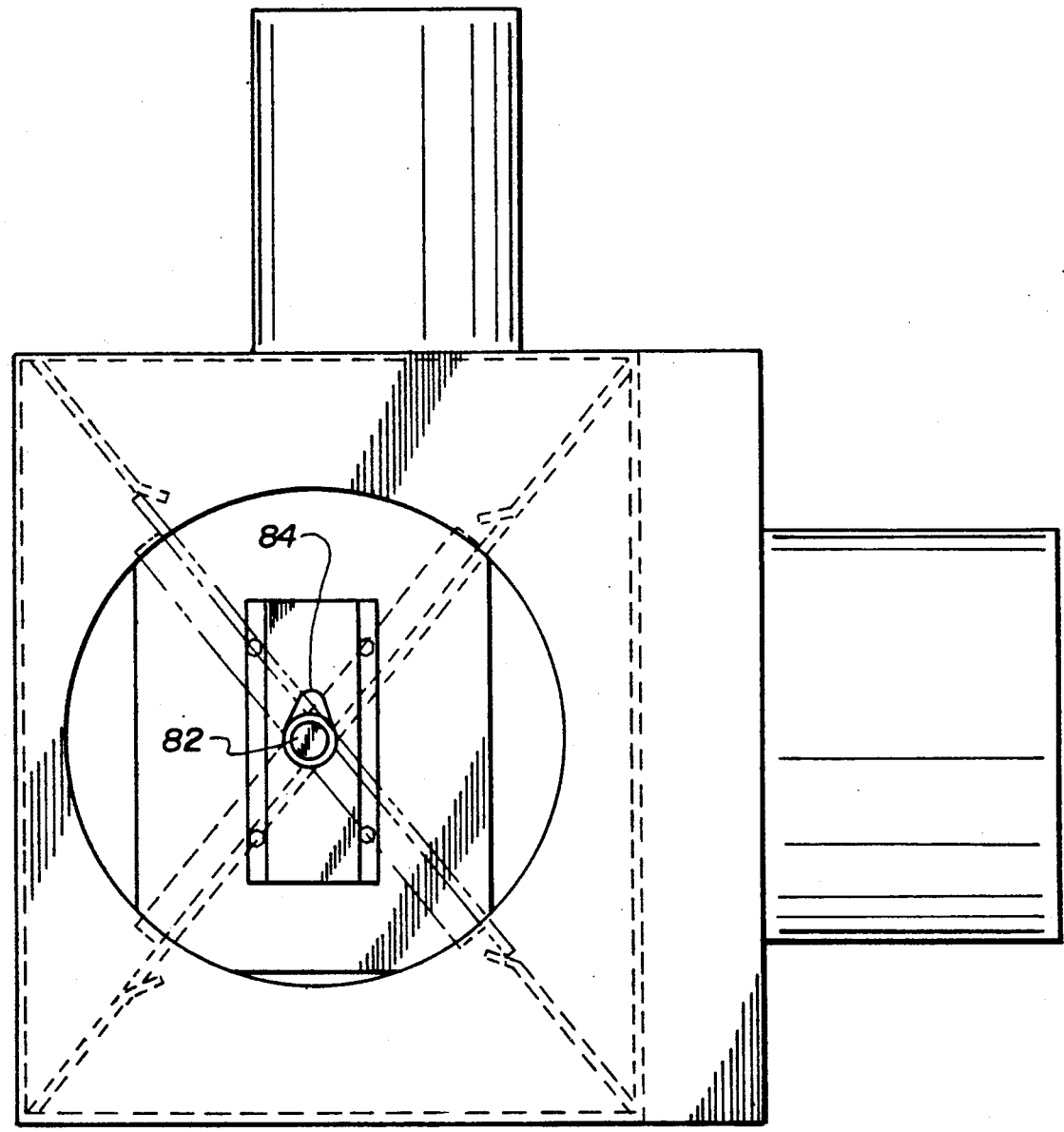
FIG._3

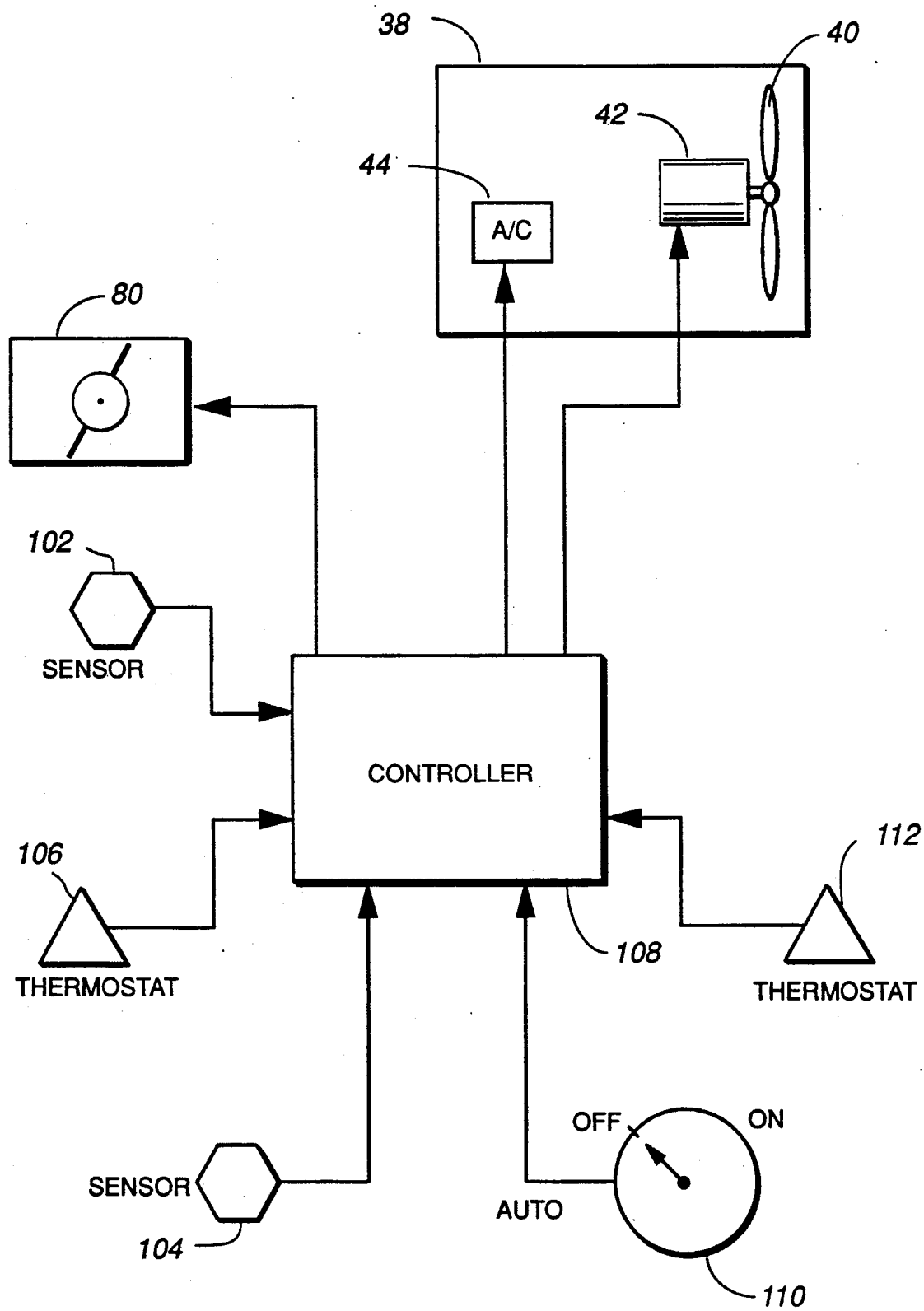
FIG._4

SYSTEM FOR COOLING THE INTERIOR OF A BUILDING

TECHNICAL FIELD

This invention relates to an apparatus and method for cooling the interior of a building. In particular, the arrangement disclosed herein efficiently cools the interior of a building in a highly cost-effective manner. According to the teachings of the present invention, air from outside the building is employed to cool the interior to supplement the operation of an air conditioner or similar device.

BACKGROUND ART

There are so-called "economizer" systems currently available on the market which deliver air from outside a building to the interior thereof. Prior art systems of this nature, however, suffer from certain deficiencies. For example, conventional prior art systems sense only outdoor air temperatures. For this reason, the prior art arrangements cannot use outside air for cooling if the outside air is warmer than the set point of the control employed in the system, even if it is much cooler outside than the air temperature within the interior of the building.

In addition, these prior art arrangements do not lend themselves for use in combination with mechanical cooling devices, being employed in lieu of air conditioners or other mechanical cooling means.

Because of these limitations, conventional "economizer" systems do not utilize outside air for building cooling as frequently as one might wish. This results in energy waste, unnecessary and expensive utilization of air conditioners or other mechanical cooling devices or, in some cases, needless discomfort to the occupants of the building.

U.S. Pat. No. 4,915,294, issued Apr. 10, 1990 to Calvin R. Wylie, discloses a system for lessening the temperature differential between the upper and lower levels of a building including sensing means for sensing the temperatures of both of the levels, air delivery means for delivering air between the level interiors, and control means for activating the air delivery means when a temperature differential of a predetermined magnitude is sensed by the sensing means. The system disclosed in such patent is not applicable for cooling a building interior through the use of outside air.

DISCLOSURE OF INVENTION

The apparatus of the present invention is utilized to cool the interior of a building in an efficient and cost effective manner.

The apparatus includes air delivery means and cooling means such as an air conditioner. First air passageway defining means defining a first air passageway communicates with ambient air outside the building. Second air passageway defining means defines a second air passageway communicating with the interior of the building. Third air passageway defining means defines a third air passageway leading from the air delivery means to the building interior.

The apparatus also includes first temperature sensing means for sensing the temperature of the ambient air outside the building. Second temperature sensing means is provided for sensing the temperature of air in the building interior.

Control means is operatively associated with the air delivery means for delivering air from outside the building to the building interior through the first and third air passageways when a temperature differential of a first predetermined magnitude is sensed by the first and second sensing means.

When a temperature differential of a second predetermined magnitude which is less than the first predetermined magnitude is sensed by the first and second sensing means, air is delivered through the second and third passageways. The control means actuates the air cooling means to cool air delivered by the air delivery means either through the first and third passageways or through the second and third air passageways when air within the building interior attains a predetermined temperature.

The apparatus additionally comprises damper means operatively associated with the air passageway defining means. The damper means includes a damper housing defining a chamber and a damper blade mounted for movement within the chamber between a first position wherein air flow communication is established through the damper housing between the first air passageway and the third air passageway and a second position wherein air flow communication is established through the damper housing between the second air passageway and third air passageway.

The control means is operable to move the damper blade to the first position when a temperature differential of the first predetermined magnitude is sensed by the first and second sensing means and to move the damper blade to the second position when a temperature differential of the second predetermined magnitude is sensed by the first and second sensing means.

Other features, advantages, and objects of the present invention will become apparent with reference to the following detailed description and accompanying drawings.

BRIEF DESCRIPTION OF DRAWINGS

FIG. 1 is a diagrammatic side view of the inside of a building incorporating apparatus constructed in accordance with the teachings of the present invention;

FIGS. 2A and 2B are somewhat diagrammatic, perspective views illustrating a damper assembly incorporated in the apparatus and the flow paths of air passing through the damper assembly when the damper blade thereof is in alternate positions;

FIG. 3 is an end view of the damper assembly; and

FIG. 4 is a schematic presentation of selected components of the apparatus and illustrating the cooperative relationship existing therebetween.

BEST MODE FOR CARRYING OUT THE INVENTION

Figure 2B:
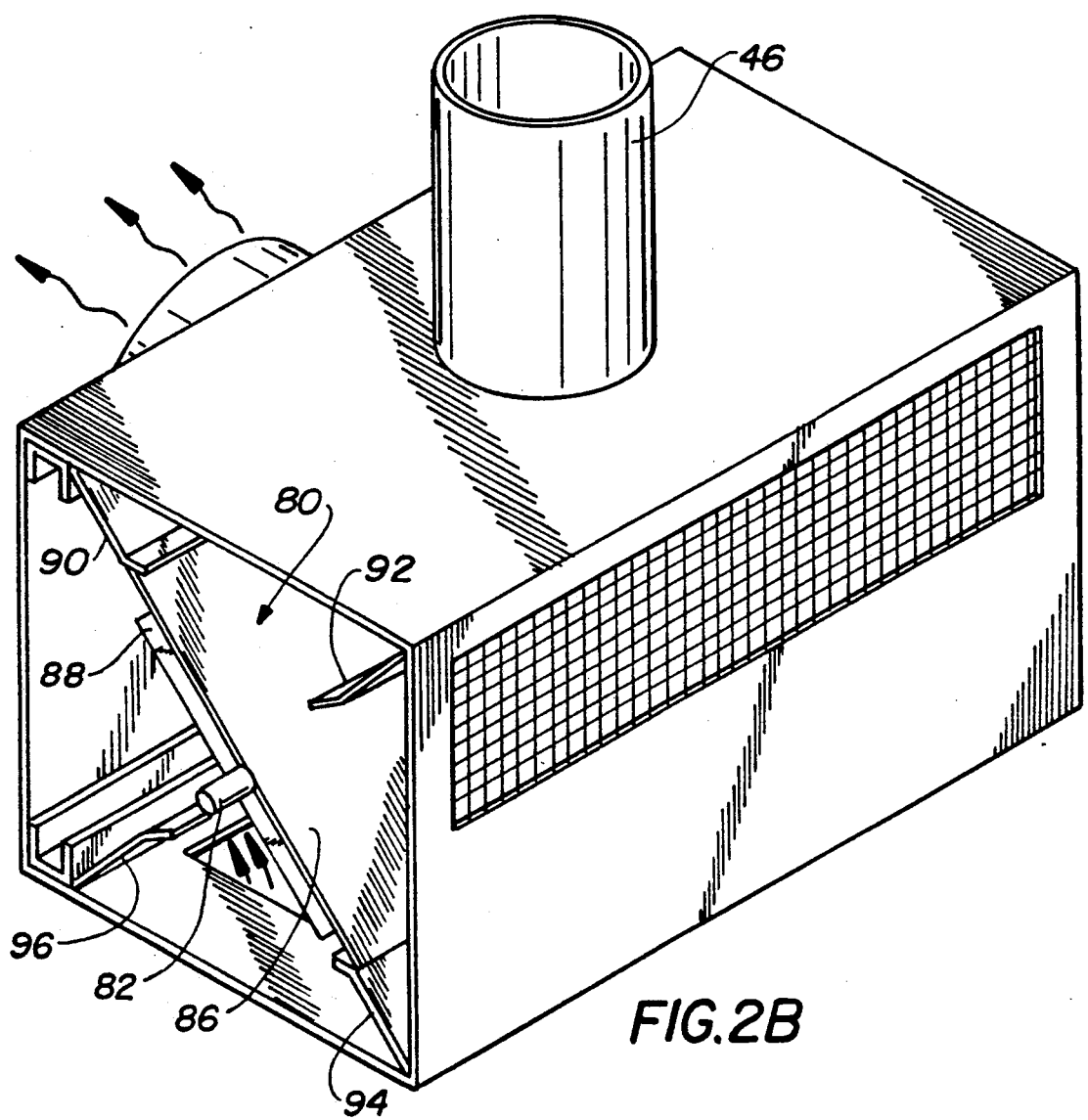

Referring now to the drawings, a building 10 is illustrated. The building may be of any suitable construction. Building 10 is of multi-level construction including an upper level 12 and a lower level 14; however, it is to be understood that the teachings of the present invention may be applied to a single-story building as well.

Upper level 12 includes, as is conventional, a floor 16, a ceiling 18, and walls, such as walls 20, 22 and 24, between the floor and ceiling to define an upper level interior.

Similarly, lower level 14 has a floor 26, a ceiling 28, and walls, such as walls 30, 32 and 34, which define a lower level interior.

Building 10 also includes an attic 36 defining an attic space 37 above ceiling 18. Positioned in the attic is a heating/cooling system 38 which includes air delivery means in the form of a fan 40 and a motor 42 of any conventional construction adapted to rotate the fan 40 when energized.

System 38 additionally includes air cooling means which, in the arrangement shown, is an air conditioner 44 which is of conventional construction.

First air passageway means in the form of a duct 46 defines a first air passageway communicating with ambient air outside building 10. In the illustrated arrangement, duct 46 has an open end 48 located above the building roof.

Second air passageway defining means in the form of a duct 50 defines a second air passageway communicating with the interior of the building. More particularly, in the illustrated arrangement, the duct 50 projects through ceiling 18 from the attic and has an open end 52 at the ceiling.

Ducts 46 and 50 both communicate with the inner chamber of a damper housing 54. A duct 56 leads from the damper housing and provides communication between the damper housing chamber and the heating/cooling system 38.

Third passageway defining means defining a third air passageway leading from the heating/cooling system 38 to the interior of the building 10 is also provided. Specifically, the third air passageway defining means is in the form of ducts 58 and 60 which lead from the heating/cooling system 38 to different locations within the interior. In the illustrated embodiment of the invention, duct 58 branches off to two locations at upper level 12 while duct 60 branches off to two locations at lower level 14. It is again pointed out, however, that the principles of the present invention are applicable to single level buildings as well as multi-level buildings and it is to be understood that the third air passageway defining means may be in the form of a single duct delivering air from the heating/cooling system to one or more interior locations. In the illustrated embodiment a damper 62 is disposed in duct 58 and a damper 64 is disposed in duct 60.

The dampers 62, 64 may be of any suitable type including round motorized dampers well known in the building heating and cooling art. It is to be understood that insofar as the present invention is concerned, dampers 62, 64 are optionally employed. That is, the method and apparatus of the present invention may be practiced with or without dampers such as dampers 62, 64.

As previously stated, ducts 46, 50, and 56 are connected to damper housing 54 with the air passageways defined by the ducts in communication with the interior chamber defined by the housing. Referring now to FIGS. 2A, 2B and 3, it will be seen that the damper housing 54 has a housing wall 66 of substantially rectangular cross section. In FIGS. 2A and 2B, for illustrative purposes, an end wall is shown as having been removed from the end of the housing closest to the viewer, such end wall normally covering the rectangular-shaped opening 68. Wall 66 and a pair of end walls define a plenum chamber.

Wall 66 has a plurality of ports formed therein, said ports communicating with the chamber and being spaced from one another about the housing wall. More specifically, in the illustrated embodiment, the housing 66 has a first air entry port (not shown) at the lower end of duct 46. Port 70 formed in the housing wall leads to duct 56. The bottom of the wall 66 defines a port 72 which communicates with the air passageway defined by duct 50. Duct 50 may simply comprise the framework of a register communicating with the interior of building 10 and the housing may be positioned directly on the floor of the attic.

The housing wall 66 defines yet another port 74, port 74 having a generally rectangular configuration and, in the arrangement illustrated, being covered by a wire mesh 76 which allows for the free flow of air therethrough but prevents foreign materials or objects from entering the housing through port 74. Port 74 communicates directly with the attic space 37 and air exiting the housing through port 74 directly enters such space.

A damper blade 80 is rotatably mounted relative to the damper housing within the chamber defined thereby. The blade is of substantially flat construction and fixedly mounted upon a shaft 82 extending between the end walls of the damper housing and journaled relative thereto. At one end thereof shaft 82 is operatively connected in a suitable manner to an electric motor, a portion of which is seen in FIG. 3 and designated by reference numeral 84. The motor itself is mounted in any suitable fashion to the end of the damper housing.

Blade 80 includes a substantially flat plate 86 of galvanized metal or the like connected at its midpoint to shaft 82. A layer of insulating material 88, said material being of any desired type, is attached to plate 86 by any suitable expedient such as by being adhesively secured thereto.

A plurality of abutment panels 90, 92, 94 and 96 are disposed within the damper housing chamber. The abutment panels project inwardly from spaced locations on the housing wall located between the ports and generally converge toward one another. The abutment panels have spaced distal ends and the damper blade extends between and engages the distal ends of a first pair of abutment panels when in a first position and extends between and engages the distal ends of a second pair of abutment panels when in a second position. The damper blade when it is in said first and second positions defines alternative air flow paths within the chamber between preselected ports. The abutment panels may be formed of sheet metal or the like and secured to the housing wall 66 by any desired expedient such as by being soldered or riveted thereto.

A pair of retention elements 98, 100 in the form of U-shaped channels project from opposed panels of the housing wall as shown in FIGS. 2A, 2B. The retention elements are disposed closely adjacent to another of the housing wall panels and are attached to the opposed wall panels immediately adjacent to abutment panels projecting from the opposed wall panels. An air filter of conventional construction (not shown) may be slid in and out of the channels as desired by the operator merely by removing a damper housing end wall, thus providing access to the housing chamber.

As stated above, the damper blade 80 is movable by motor 84 between first and second positions. FIG. 2A illustrates the first position wherein air flow communication is established through the damper housing 54 between the first air passageway defined by duct 46 and the third air passageway including ducts 58, 60 leading from the heating/cooling system 38 to the building interior. It will be understood that air flow results upon actuation of the air delivery means in the form of fan 40 and motor 42. Dampers 62, 64, of course, are open when air flow passes through both ducts 58 and 60. In FIG. 1, the position assumed by the damper blade 80 when in said first position is shown in dash lines.

Air pressure can, of course, build up within the building interior when the damper blade is in its first position and air is being directed by the air delivery means from outside the building and through ducts 46, 58 and 60. To relieve such pressure the pressurized air within the interior enters open end 52 of duct 50. The flow of air continues through port 72 into the damper housing chamber and then out of the chamber through port 74 into the attic space. This flow of air is illustrated diagrammatically by the arrows in FIG. 2A. The insulation layer of the damper blade helps to maintain a clear demarcation between the air flow paths on opposed sides thereof to prevent undesired thermal transfer.

Referring now to FIG. 2B, the second position assumed by the damper blade 80 is illustrated. In this second position air flow communication is established through the damper housing 54 between the second air passageway defined by duct 50 and the third air passageway defined by ducts 58, 60. When the blade is in this position no appreciable airflow will exist through duct 46 or port 74.

The apparatus of the present invention also includes first temperature sensing means for sensing the temperature of the ambient air outside building 10. In FIG. 1, such sensing means is designated by reference numeral 102. The first temperature sensing means is in the form of a temperature sensor or probe which, as shown, may be positioned on the end of duct 46 projecting outside the building roof.

Second temperature sensing means in the form of a temperature sensor or probe is provided for sensing the temperature of the interior of building 10. This sensor is identified by reference numeral 104. Sensor 104 is suitably positioned closely adjacent to a thermostat of suitable conventional construction and which is designated in FIG. 1 by reference numeral 106.

The temperature sensors 102, 104 and thermostat 106 comprise part of control means operatively associated with the air delivery means and the air conditioner for actuating the air delivery means to deliver air from outside the building to the building interior through the first and third air passageways when a temperature differential of a first predetermined magnitude is sensed by the first and second sensing means and to deliver air through the second and third passageways when a temperature differential of a second predetermined magnitude which is less than the first magnitude is sensed by the first and second sensing means. The control means also actuates the air conditioner to cool air passing through the air passageways when a predetermined temperature within the building interior is sensed.

The other operational components of the control means will now be described as will the operational relationship between the control means and the rest of the apparatus.

Located at a suitable location within building 10 is a controller 108. In the arrangement shown in FIG. 1, controller 108 is connected to the heating/cooling system 38, although it is to be understood that the controller may be placed at any other desirable area. The controller is preferably a microprocessor unit suitably programmed to perform the functions desired and which will be described below.

As shown in FIG. 4, the controller 108 is wired to the sensors 102, 104 and the thermostat 106. Additionally, controller 108 is operatively associated with a control switch 110 which is mounted within the building interior. The switch 110 has alternative "AUTO", "ON" and "OFF" modes.

Thermostat 106 may be considered the air conditioning thermostat which is set by the occupant to the desired indoor temperature, considering overall comfort and energy conservation. A second thermostat 112 is operatively associated with switch 110 and will hereinafter be referred to as the vent system thermostat.

Operation of the system of the present invention will now be described.

The occupant will normally set the air conditioning thermostat 106 to the cooling position and set the temperature to the desired indoor temperature, considering overall comfort and energy conservation. For example, the setting might be 78 degrees Fahrenheit, which would then be the maximum desired temperature for the structure. The occupant then places the selector of switch 110 associated with the vent system thermostat 112 to the AUTO position, and sets the temperature dial on the vent system thermostat 112 to the minimum desired indoor temperature, for example 70 degrees Fahrenheit.

The operation of the system will now be described by running through a typical daily operation, based on the above indicated temperature settings of the thermostats 106 and 112. The building may start the day out at about 70 degrees. As the solar load begins building up within the interior of the building, the indoor temperature will rise above the 70 degree set-point of the vent system thermostat 112. If the outdoor air temperature is below the temperature within the building by a first predetermined magnitude, for example six degrees, controller 108 will energize motor 42 to rotate fan 40. Also, the controller will cause movement of damper blade 80 to its first position wherein air is drawn from outside the building through duct 46 and transported through ducts 58, 60 (assuming, of course, that dampers 62, 64 are both open). Thus, the relatively cool outside air will be used to lower the temperature of the building interior.

The damper blade 80, being in its first position, will allow the positive air pressure buildup within the building interior to exhaust through duct 50, damper housing 54 and port 74 into the attic, which helps to cool the attic down as well.

The system will continue to operate as just described until either the indoor temperature drops to the 70 degree set-point of the vent system thermostat 112 or to within a predetermined number of degrees, such as three degrees, of the outdoor air. In the event either of these conditions occur the controller 108 will de-energize the motor-fan combination 40, 42 and the damper blade 80 will move to its second position.

As the outdoor air temperature continues rising, the indoor temperature will exceed the 78 degree air conditioning thermostat set-point. The air conditioner 44 then will be energized and the system will cycle on and off during the day as required to maintain the desired temperature. During this phase of operation, the air will be circulated within the interior of the building through duct 50, damper housing 54, and ducts 58, 60 (again assuming that dampers 62, 64 are open).

Toward the evening hours, the outdoor temperature may again decrease to a point a predetermined number of degrees, for example six degrees, lower than the temperature of the indoor air, at which point the controller 108 will again cause movement of the damper blade to its first position and actuate the air delivery means to draw air from outside the building through duct 46. If the air conditioner is energized at that time the system will work in conjunction therewith by bringing in the cooler outdoor air and cooling it further, rather than cooling the warmer indoor air.

When the indoor temperature drops to the 78 degree setpoint established at the air conditioning thermostat 102 the mechanical cooling cuts off. However, motor 42 and fan 40 still remain actuated and the system will continue to bring in cooler outdoor air. Again, this operation will continue until either the indoor air drops to the 70 degree vent system thermostat 112 temperature or until the indoor air temperature falls to within a predetermined differential, such as three degrees, of the outdoor air temperature.

The system can be manually operated to provide fresh air ventilation, regardless of inside or outside temperatures, if desired. For this option, the occupant will position the switch 110 associated with the vent system thermostat to the ON position. Controller 108 will energize the motor 42 and position the damper blade 80 in its first position or outdoor air mode. If the outdoor air is relatively cool, another possibility would be to simply lower the setting on the vent system thermostat 112, which would provide the same result, except that there would be a minimum indoor temperature limit, e.g. 65 degrees.

Should the user switch the selector switch 110 associated with thermostat 112 to the OFF position, the system will be de-energized, and the heating/cooling system will operate normally with no outside air cooling or ventilation.

We claim:

1. Apparatus for cooling the interior of a building including an attic defining attic space, said apparatus comprising, in combination:

air delivery means;

air passageway defining means including first air passageway defining means defining a first air passageway communicating with ambient air outside said building, second air passageway defining means defining a second air passageway communicating with said building interior, and third air passageway defining means defining a third air passageway leading from said air delivery means to said building interior;

first temperature sensing means for sensing the temperature of the ambient air outside said building;

second temperature sensing means for sensing the temperature of air in said building interior;

control means operatively associated with said air delivery means for delivering air from outside said building to said building interior through said first and third air passageways when a temperature differential of a first predetermined magnitude is sensed by said first and second sensing means and for delivering air through said second and third passageways when a temperature differential of a second predetermined magnitude less than said first magnitude is sensed by said first and second sensing means;

air cooling means, said control means actuating said air cooling means to cool air delivered by said air delivery means either through said first and third air passageways or through said second and third air passageways when air within said building interior attains a predetermined temperature; and damper means operatively associated with said air passageway defining means, said damper means including a damper housing defining a chamber and a damper blade mounted for movement within said chamber between a first position wherein air flow communication is established through said damper housing between said first air passageway and said third air passageway and a second position wherein air flow communication is established through said damper housing between said second air passageway and said third air passageway, said control means operable to move said damper blade to said first position when a temperature differential of said first predetermined magnitude a sensed by said first and second sensing means and to move said damper blade to said second position when a temperature differential of said second predetermined magnitude is sensed by said first and second sensing means, said damper housing defining a first air entry port leading from said first air passageway, a second air entry port leading from said second air passageway, a first air exit port leading to said air delivery means and said air cooling means, and a second air exit port, said damper blade establishing communication between said second air exit port and said second air passageway when said damper blade is in said first position, and said second air exit port communicating with said attic space to relive the build-up of air pressure within said building interior resulting from the delivery of air from outside said building to said interior by said delivery means when said damper blade is in said first position.

2. The apparatus according to claim 1 wherein said damper means additionally comprises means for moving said damper blade within said damper housing, said means for moving said damper blade being in operative association with said control means and actuable thereby when said sensing means sense a temperature differential of predetermined magnitude.

3. A method of cooling the interior of a building having an attic, said method comprising the steps of:

sensing the temperature of ambient air outside said building;

sensing the temperature of air in said building interior;

delivering air from outside said building into said building when a temperature differential of a first predetermined magnitude is sensed;

substantially terminating air flow from outside said building into said interior when a temperature differential of a second predetermined magnitude less than said first magnitude is sensed; and cooling air within said building interior when said air attains a predetermined temperature; and venting air from said building interior into said space defined by said attic during the step of delivering air from outside said building into said building interior to relive the build-up of air pressure within said building interior.

4. Apparatus for cooling the interior of a building having an attic, said apparatus comprising, in combination:

means for sensing the temperature of ambient air outside said building;

means for sensing the temperature of the air in said building interior;

means for deliverying air from outside said building into said building when a temperature differential of a first predetermined magnitude is sensed;

means for substantially terminating air flow from outside said building into said interior when a temperature differential of a second predetermined magnitude less than said first predetermined magnitude is sensed;

means for cooling air within said building interior when said air attains a predetermined temperature; and means for venting air from said building interior into space defined by said attic while delivering air from outside said building into said building interior to relieve the build-up of air pressure within said building interior.

* * * * *